US 6,559,092 B1

(12) United States Patent
Dufresne et al.

(10) Patent No.: US 6,559,092 B1
(45) Date of Patent: May 6, 2003

(54) PRECARBONISATION OF A HYDROTREATMENT CATALYST

(75) Inventors: Pierre Dufresne, Valence (FR); Franck Labruyere, Saint Georges les Bains (FR); Michel Lacroix, Lyons (FR); Christophe Geantet, Miribel (FR); Cecile Glasson, Villeurbanne (FR)

(73) Assignee: Europeenne de Retraitement de Catalyseurs Eurecat, La Voulte sur Rhone (FR)

( * ) Notice: Subject to any disclaimer, the term of this patent is extended or adjusted under 35 U.S.C. 154(b) by 0 days.

(21) Appl. No.: 09/639,880

(22) Filed: Aug. 17, 2000

(30) Foreign Application Priority Data

Aug. 17, 1999 (FR) .............................. 99 10577

(51) Int. Cl.⁷ ..................... B01J 21/18; B01J 27/02
(52) U.S. Cl. ........................ 502/180; 502/216
(58) Field of Search .................. 502/180, 216

(56) References Cited

U.S. PATENT DOCUMENTS

| 5,397,756 A | * | 3/1995 | Dufresne et al. | 502/33 |
| 5,462,904 A | * | 10/1995 | Resasco et al. | 502/222 |
| 5,489,722 A | * | 2/1996 | Resasco et al. | 585/661 |
| 5,733,518 A | * | 3/1998 | Durante et al. | 423/248 |
| 5,922,638 A | * | 7/1999 | Dufresne et al. | 502/216 |
| 6,059,956 A | * | 5/2000 | Dufresne | 208/108 |
| 6,100,216 A | * | 8/2000 | Dufresne et al. | 502/219 |

FOREIGN PATENT DOCUMENTS

EP    0 745 660 A1    12/1996

* cited by examiner

*Primary Examiner*—Mark L. Bell
*Assistant Examiner*—Patricia L. Hailey
(74) *Attorney, Agent, or Firm*—Millen, White, Zelano & Branigan, P.C.

(57) ABSTRACT

The present invention concerns a process for sulphurising a hydrocarbon hydrotreatment catalyst in the presence of hydrogen and at least one sulphur-containing compound. The process is characterized in that the catalyst comprises a carbon-containing compound the major portion of which is not leachable deposited in its pores. The invention is of particular application to sulphurization carried out off-site.

6 Claims, No Drawings

PRECARBONISATION OF A HYDROTREATMENT CATALYST

SUBJECT MATTER OF THE INVENTION

Hydrotreatment catalysts generally comprising an amorphous or crystalline oxide support such as an alumina, a silica, a silica-alumina or a zeolite on which at least one element from groups VIII and VI of the periodic table or a combination of several elements from these same groups is deposited, such as solids designated $CoMo/Al_2O_3$, $NiMo/Al_2O_3$ or $NiW/Al_2O_3$, must first be sulphurised to endow them with catalytic performances for all hydrotreatment reactions such as hydrodesulphurisation, hydrodenitrogenation, demetallisation and certain hydrogenation reactions. This sulphurisation step prior to catalysis proper can be carried out in different manners.

The first manner, known as in situ sulphurisation, is characterized by the fact that the catalyst in its oxide form is charged into the hydrocarbon conversion reactor first for sulphurisation therein. The second manner, known as off-site pre-sulphurisation, as described in a variety of the Applicant's patents (U.S. Pat. Nos. 4,719,195, 5,397,756, European patent EP-A-0 785 022), differ from the preceding manner in that sulphurisation or pre-sulphurisation of the catalyst is carried out in a particular unit which is distinct from the hydrotreatment reactor.

European patent application EP-A1-0 745 660 describes a coking step carried out after the catalyst pre-sulphurisation phase, which are both carried out in situ, i.e., inside the hydrocarbon conversion reactor. That process for post-coking catalysts for hydrotreating gasoline cuts from catalytic cracking containing sulphur-containing compounds and olefinic compounds describes selective poisoning of active hydrogenating sites which, while maintaining the hydrodesulphurising properties of the catalyst, limit hydrogenation of the olefins responsible for the octane number of such gasolines.

The aim of the present invention is to carry out pre-sulphurisation of the catalyst in the presence of hydrogen and at least one sulphur-containing compound which may be hydrogen sulphide or any other sulphur-containing compound which can generate hydrogen sulphide by hydrogenolysis, characterized in that in order to improve the catalytic performances in the hydrotreatment reactions, the catalyst is pre-carbonised so as to deposit solid carbon in the pores of the catalyst, the major portion of said carbon being non leachable. The process of the invention is of particular application to pre-sulphurisation carried out off-site.

The present invention, characterized by carrying out pre-carbonisation, can improve the hydrodesulphurising and hydrogenating properties of the catalyst. Further, it has been shown that this pre-carbonisation can reduce the initial selectivity for the cracking product and for isomerisation. One explanation may be that this drop in selectivity for cracking and for isomerisation is due to the carbon deposit attenuating the acidity of the support. Catalyst deactivation can thus be reduced and its service life increases.

Pre-carbonisation can be carried out prior to the pre-sulphurisation phase or simultaneously with said pre-carbonisation step, or even before and simultaneously with said pre-sulphurisation step. When pre-carbonisation is carried out prior to pre-sulphurisation of the catalyst off-site, then any technique which can deposit solid carbon in a mainly non leachable form and homogeneously in the pores of the catalyst may be suitable, such as dry impregnation or chemisorption, both combined with heat treatment.

For impregnation carried out at ambient temperature, the liquid carbon-containing compound is introduced into the pores of the catalyst without necessarily filling the pore volume of the catalyst completely. Thus the impregnation volume is partially filled to between 10% and 100%, preferably in the range 20% to 90%. Suitable carbon-containing sources can be selected from paraffinic, naphthenic and/or aliphatic hydrocarbons, and also from organic oxygen-containing compounds such as alcohols, ketones, aldehydes, organic acids, fatty acids and vegetable oils. These compounds are characterized by high boiling points, for example between 150° C. and 500° C., preferably over 200° C. The quantity of carbon deposited at the end of the impregnation step is in the range 2% to 30% by weight with respect to the mass of oxide catalyst.

Following the impregnation step, a heat treatment step is necessary, this heat treatment step being carried out in nitrogen or another inert gas, at a temperature in the range 150° C. to 650° C., preferably in the range 300° C. to 500° C. or in air at a temperature in the range 50° C. to 400° C., preferably at a temperature of less than 350° C. The aim of this subsequent heat treatment, or pyrolysis, preferably carried out in an inert gas, is twofold. Firstly it has the function of re-adjusting the amount of carbon to between 2% and 10% by weight, preferably in the range 3% to 7% by weight with respect to the oxide matrix, and secondly to transform the hydrocarbons, which may or may not contain oxygen, introduced during the impregnation step, such that the residual carbon, in an amount in the range 2% by weight to 10% by weight and preferably in the range 3% by weight to 7% by weight with respect to the oxide, is a residual carbon-containing compound the major portion of which is not leachable in refluxed toluene. The major portion of the residual carbon-containing compound is not leachable in refluxed toluene, i.e., the degree of leaching is less than 40%, preferably less than 30% and more preferably less than 20%.

Pre-carbonisation can also be carried out by direct reaction between the solid and a hydrocarbon compound. It is possible to use a compound which is quick to polymerise, such as olefins or diolefins at a temperature in the range 20° C. to 400° C.

Carbonisation can also be carried out simultaneously with the catalyst sulphurisation step, the gaseous carbon-containing compound being introduced into the gas phase simultaneously with the sulpho-reducing mixture constituted by hydrogen and hydrogen sulphide. Suitable carbon-containing compounds for this pre-carbonisation method are compounds which are quick to polymerise such as olefins or diolefins.

For this catalyst pre-carbonisation method which is simultaneous with pre-sulphurisation, the carbonisation gas can be introduced into the gas phase via an injection point which is either identical to or different from that used to introduce the sulphurising mixture. In the latter case, and for example when using a rotating cylindrical furnace, this displacement of the carbonisation mixture introduction point with respect to the sulpho-reducing mixture introduction point can be radial or axial. It is preferably carried out such that the carbonisation phase is carried out in a temperature range which is lower than the maximum sulphurisation temperature.

The pre-carbonised catalyst sulphurisation step can be carried out at atmospheric pressure in a reactor heated to between 200° C. and 600° C., preferably in the range 200° C. to 500° C., in the presence of a sulpho-reducing gas mixture. More particularly, the method of the invention is applicable to off-site sulphurisations which can be carried out at high temperature, for example at temperatures of more than 400° C. The reactor used can be a fixed bed type reactor or a system using moving bed technology such as a rotating bed, a fluidised bed or a sinking bed. The sulpho-reducing gaseous mixture is constituted by hydrogen and hydrogen sulphide, with a hydrogen sulphide partial pressure in the range 5000 to 71000 Pascals. The hydrogen sulphide is either generated in the reaction chamber by hydrogenolysis of a sulphur-containing compound in the presence of hydrogen (nascent hydrogen sulphide), such as thiols, organic sulphides, organic disulphides and organic polysulphides, or introduced simultaneously with the hydrogen. In the case where moving bed technology is used, pre-sulphurisation is said to be co-current if the sulpho-reducing mixture is introduced at the catalyst injection point, and it is said to be counter-current if the gaseous mixture is introduced at the catalyst exit point.

EXAMPLE 1 (COMPARATIVE)

A hydrotreatment catalyst containing 18.2% by weight of molybdenum oxide and 3.8% by weight of cobalt oxide deposited on an alumina support with a large specific surface area (220 m$^2$/g) was sulphurised at atmospheric pressure with a sulpho-reducing mixture containing 15% by volume of hydrogen sulphide ($H_2S$) and 85% by volume of hydrogen ($H_2$). The catalyst was sulphurised in two steps the first was a controlled temperature rise step (5° C./min) the second a constant temperature stage lasting 4 hours at the final sulphurisation temperature selected. The final Was sulphurisation temperature was either 400° C. or 500° C. After sulphurisation, the catalyst was cooled in a stream of nitrogen to ambient temperature. At this temperature, a portion of the sulphurised catalyst was transferred under a nitrogen atmosphere to analyse its degree of sulphurisation. The remainder was transferred under the same conditions to the reactors of two catalytic test units using a model feed (hydrodesulphurisation of thiophene at atmospheric hydrogen pressure and hydrogenation of tetrahydronaphthalene under hydrogen pressure).

For these two off-site sulphurisation modes (with a variation in the final treatment temperature), the results for the degrees of sulphurisation prior to the test are shown in the table below. The degree of sulphurisation is defined as the ratio between the experimental S/(Co+Mo) mole ratio and theoretical S/(Co+Mo) mole ratio. In the present case this theoretical ratio, corresponding to total transformation of molybdenum oxide $MoO_3$ and cobalt oxide CoO to the respective sulphides $MoS_2$ and $Co_9S_8$, was: $[S/(Co+Mo)]_{theo}=1.64$.

These catalysts are hereinafter termed "reference catalysts".

| | S/(Co + Mo) | Degree of sulphurisation (%) |
|---|---|---|
| $H_2S$—$H_2$ (15/85) sulphurisation at 400° C. | 1.70 | 104% |
| $H_2S$—$H_2$ (15/85) sulphurisation at 500° C. | 1.70 | 104% |

In parallel to these sulphurisation characteristics of an off-site sulphurisation process, the same oxide catalyst was charged into the reactor of a gas oil hydrodesulphurisation test unit operating under hydrogen pressure and in the liquid phase. Prior to measuring the activity, that catalyst was sulphurised (in situ mode) with a sulpho-reducing mixture constituted by 5% by volume of hydrogen sulphide and 95% of hydrogen by gradually increasing the temperature (5° C./min) from ambient temperature (25° C.) to 380° C. After a constant temperature stage of 11 hours at 380° C., the catalyst was cooled to ambient temperature in a stream of nitrogen. This mode of sulphurisation, known as "in situ" sulphurisation, did not permit analysis of the degree of sulphurisation of the catalyst prior to the activity test. The activities of these three tests (thiophene hydrodesulphurisation, tetrahydronaphthalene hydrogenation, gas oil hydrodesulphurisation) were subsequently used as the reference.

EXAMPLE 2

Pre-impregnation—Comparative

The same catalyst as that used in Example 1 was impregnated to 90% of its impregnation volume with an atmospheric distillation gas oil with an initial boiling point and end point of 250° C. and 350° C. Before the sulphurisation treatment, a portion of the solid was removed to analyse the total quantity of impregnated carbon. The quantity of carbon present on the pre-impregnated solid was 28% by weight, corresponding to a mole ratio C/(Co+Mo) of 11.71. After leaching in a soxhlet with refluxing toluene, the amount of residual carbon (non extractible) present on the pre-carbonised solid, was 0.2% by weight, corresponding to a mole ratio C/(Co+Mo) of 0.48, representing a degree of leaching of 99.3%. After charging into the off-site sulphurisation reactor, this catalyst was sulphurised as described in Example 1, at 400° C. and at 500° C. After these sulphurisation treatments, a portion of the sample was removed under nitrogen to analyse the degree of sulphurisation and the residual carbon. The results of the analyses, expressed in the form of the mole ratios C/(Co+Mo) and S/(Co+Mo) before and after the sulphurisation treatment, are shown in the table below.

| | | After sulphurisation treatment | | |
|---|---|---|---|---|
| | C/(Co + Mo) before sulphurisation | C/(Co + Mo) | S/(Co + Mo) | Degree of sulphurisation (%) |
| $H_2S$—$H_2$ (15/85) sulphurisation at 400° C. | 11.71 | 0.92 | 1.69 | 103% |
| $H_2S$—$H_2$ (15/85) sulphurisation at 500° C. | 11.71 | 0.66 | 1.71 | 104% |

EXAMPLE 3

Pre-carbonisation

The catalyst used in Example 1 was first impregnated to 90% of its impregnation volume with a vegetable oil (rapeseed oil). After heat treatment in nitrogen at 400° C. for 4 hours, a treatment which was intended to pyrolyse the organic molecule to liberate the lightest fragments and only leave a slightly hydrogenated carbon residue on the catalyst which is largely non leachable in hot toluene, the catalyst was cooled to ambient temperature keeping it under nitrogen. Before the sulphurisation treatment, a portion of the solid was removed to analyse the quantity of carbon remaining on the oxide catalyst after the pyrolysis treatment. The quantity of carbon present on the pre-carbonised solid was 4.9% by weight, corresponding to a C/(Co+Mo) mole ratio of 2.31. After leaching, in a soxhlet with toluene under reflux, the residual carbon content (non extractible) present on the pre-carbonised solid was 4.3% by weight, corresponding to a C/(Co+Mo) mole ratio of 2.02, representing a degree of leaching of 12.2%. After sulphurising this catalyst as described in Example 1 at 400° C. and at 500° C. and cooling in nitrogen, a portion of the sample was removed under nitrogen to analyse the decree of sulphurisation and the residual carbon. The results of the analyses expressed in the form of the mole ratios C/(Co+Mo) and S/(Co+Mo) before and after the sulphurisation treatment are shown in the table below. These catalysts are hereinafter termed "pre-carbonised catalysts".

|  | After sulphurisation treatment | | |
| --- | --- | --- | --- |
|  | C/(Co + Mo) before sulphurisation | C/(Co + Mo) | S/(Co + Mo) | Degree of sulphurisation (%) |
| $H_2S$—$H_2$ (15/85) sulphurisation at 400° C. | 2.31 | 1.72 | 1.63 | 99% |
| $H_2S$—$H_2$ (15/85) sulphurisation at 500° C. | 2.31 | 1.58 | 1.69 | 103% |

Sulphurisation in the gas oil hydrodesulphurisation test unit was carried out on the pre-carbonised oxide under the same conditions as those described for Example 1.

EXAMPLE 4

A Further Pre-carbonisation Method

The catalyst used in Example 1 was impregnated to 90% of its impregnation volume with a mineral oil (1 50 Neutral Solvent) with a density of 0.875 g/cm³. After pyrolysis treatment in a stream of nitrogen at 350° C. for 4 hours, a portion of the solid was removed to analyse the amount of carbon before and after leaching with toluene under reflux. The results of the carbon determination before and after the leaching treatment, expressed with respect to the pre-carbonised catalyst, were respectively 5.0% and 4.1%, corresponding respectively to mole ratios C/(Co+Mo) of 2.49 and 1.94, representing a degree of leaching of 18%. After sulphurisation of this catalyst as described in Example 1 at 400° C. and 500° C. and cooling in nitrogen, a portion of the sample was removed under nitrogen to analyse the degree of sulphurisation and the residual carbon. The results of the analyses, expressed in the form of the mole ratios C/(Co+Mo) and S/(Co+Mo) before and after sulphurisation treatment, are shown in the table below.

|  | After sulphurisation treatment | | |
| --- | --- | --- | --- |
|  | C/(Co + Mo) before sulphurisation | C/(Co + Mo) | S/(Co + Mo) | Degree of sulphurisation (%) |
| $H_2S$—$H_2$ (15/85) sulphurisation at 400° C. | 2.49 | 1.16 | 1.66 | 101% |
| $H_2S$—$H_2$ (15/85) sulphurisation at 500° C. | 2.49 | 1.08 | 1.69 | 103% |

EXAMPLE 5

Activity Results and Conclusion

Thiophene Hydrodesulphurisation Activity in 0.1 MPa of Hydrogen in the Gas Phase After charging, under nitrogen, the reactor for the thiophene HDS catalytic test unit with one of the sulphurised catalysts described above (Examples 1 to 3) and introducing the reactant mixture composed of 97.2% by volume of hydrogen and 2.8% by volume of thiophene, the temperature was gradually increased (5° C./min) to 300° C. After 15 hours of stabilisation at 300° C., samples were removed from the gaseous effluents and analysed using gas chromatography to measure the residual amount of thiophene to give the degree of conversion. The activity or specific speed of each catalyst was calculated from the degree of conversion of the reactant, its molar flow rate and the mass of the catalyst charged into the reactor. The relative activity is defined as the ratio between the specific speeds measured for the pre-carbonised catalysts (Example 3) and for the reference catalysts (Example 1) sulphurised at the same temperature. The results are shown in the table below.

| Catalyst | Sulphurisation temperature (° C.) | Specific speed ($10^{-6}$.mole.g$^{-1}$.s$^{-1}$) | Relative activity (%) |
| --- | --- | --- | --- |
| Reference | 400° C. | 1.6 | 100% |
| Pre-carbonised | 400° C. | 2.5 | 156% |
| Reference | 500° C. | 1.6 | 100% |
| Pre-carbonised | 500° C. | 2.7 | 169% |

Tetrahydronaphthalene Hydrogenation Activity in 4.5 MPa of Hydrogen in the Gas Phase After charging, after nitrogen, the reactor of the catalytic test unit with one of the sulphurised catalysts described above (Examples 1 to 3) and introducing the reactant mixture, at a total pressure of 4.5 MPa, composed of 99.84% by volume of hydrogen, 0.13% by volume of tetrahydronaphthalene and 0.03% by volume of hydrogen sulphide, the temperature was gradually increased (5° C./min) to 300° C. After 10 hours of stabilisation at 300° C., samples were removed from the gaseous effluents and analysed using gas chromatography to measure the residual amount of tetrahydronaphthalene to give the degree of conversion. The activity or specific speed of each catalyst was calculated from the degree of conversion of the reactant, its molar flow rate and the mass of the catalyst charged into the reactor. The relative activity is defined as the ratio between the specific speeds measured for the pre-carbonised catalysts (Example 3) and for the reference catalysts (Example 1) sulphurised at the same temperature. The results are shown in the table below.

| Catalyst | Sulphurisation temperature (° C.) | Specific speed ($10^{-7}$.mole.$g^{-1}$.$s^{-1}$) | Relative activity (%) |
|---|---|---|---|
| Reference | 400° C. | 1.8 | 100% |
| Pre-carbonised | 400° C. | 2.0 | 111% |
| Reference | 500° C. | 1.7 | 100% |
| Pre-carbonised | 500° C. | 2.4 | 141% |

Selectivity for Cracking Products and Isomerisation Products for Hydrogenation of Tetrahydronaphthalene in 4.5 MPa of Hydrogen in the Gas Phase.

After 10 hours of stabilisation at a temperature of 300° C. in the preceding test, the temperature of the catalytic test unit was adjusted to obtain a tetrahydronaphthalene conversion of the order of 7%. Analyses carried out using gas chromatography in the gaseous effluents enabled the cracking products (alkylbenzene, benzene and alkylcyclohexane) and the isomerisation products (methyl-1- or -2-indane and perhydro-indane) to be quantified. The selectivity results for the untreated catalysts (Example 1) and pre-carbonised products (Example 3) are shown in the table below.

| Catalyst | Sulphurisation temperature (° C.) | C/(Co + Mo) before tetrahydronaphthalene test | C/(Co + Mo) after tetrahydronaphthalene test | Selectivity (%) cracking and isomerisation |
|---|---|---|---|---|
| Reference | 400° C. | 0 | 1.46 | 10% |
| Pre-carbonised | 400° C. | 1.72 | 1.72 | 4% |
| Reference | 500° C. | 0 | 1.62 | 10% |
| Pre-carbonised | 500° C. | 1.58 | 1.58 | 4% |

Hydrodesulphurisation Activity of a Gas Oil in 3 MPa of Hydrogen in the Liquid Phase The solids termed reference and pre-carbonised solids were sulphurised in the gas oil HDS test unit as described in Example 1. At the end of the sulphurisation phase, the unit was pressurised with 3 MPa (30 bars) of hydrogen. The test gas oil (initial point 229° C. and end point 383° C.) with a specific density of 0.850 containing 1.32% by weight of sulphur was introduced at an hourly space velocity (HSV) of 8 $h^{-1}$. After filling the unit and stabilising the hydrogen pressure, the temperature was increased to 340° C.

After 2 hours of stabilisation under operating conditions defining the initial time for the catalyst with the feed, samples of liquid effluents were collected over a period of 18 hours to analyse the residual sulphur content by X ray fluorescence. The activity (k) of the order of 2.17, expressed as $10^{-1}$.$g^{-1.17}$.$mmole^{-1.17}$.$h^{-1}$ was then calculated. The relative activity (or RWA [%]) is defined as the ratio between the activities "k" measured using reference and pre-carbonised catalysts and the initial activity ($k_i$) measured at the initial time on the reference catalyst. The evolution with time of the activities k and RWA of each catalyst are shown in the following table:

| Time in oil* (hour) | +0 h | | +6 h | | +16 h | |
|---|---|---|---|---|---|---|
| Catalyst | k | RWA | k | RWA | k | RWA |
| Reference | 4.6 ($k_i$) | 100% | 4.2 | 91% | 3.8 | 83% |
| Pre-carbonised | 6.0 | 130% | 5.2 | 113% | 5.1 | 111% |

CONCLUSIONS

Pre-carbonisation produced a large gain in activity with respect to conventional sulphurisation of an oxide in $H_2S$—$H_2$ in the gas phase, the gain being all the more notable when sulphurisation was carried out at high temperature.

Pre-carbonisation could reduce the selectivity for cracking products and isomerisation products probably by neutralising the acid sites of the support. The degree of coking of the pre-carbonised products was much lower than with untreated oxides.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 99/10.577, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for pre-sulphurising a hydrocarbon conversion catalyst in the presence of hydrogen and at least one sulphurised compound, comprising precarbonising said catalyst before the pre-sulphurization treatment at a temperature in the range of 150° C. to 650° C. so as to deposit a carbon-containing compound, the major portion of said carbon being non-leachable, in the pores of the catalyst and pre-sulphurising pre-carbonised catalyst.

2. A process according to claim 1, carried out ex situ.

3. A pre-sulphurised and pre-carbonised catalyst produced in accordance with the process of claim 1.

4. The process according to claim 1, wherein the treatment temperature is in the range of 300° C. to 500° C.

5. The process to claim 1, wherein said catalyst comprises 2% to 10% by weight of carbon.

6. A process for pre-sulphurising a hydrocarbon conversion catalyst in the presence of hydrogen and at least one sulphurised compound, consisting essentially of precarbonising said catalyst before the pre-sulphurization treatment at a temperature in the range of 150° C. to 650° C. so as to deposit a carbon-containing compound, the major portion of said carbon being non-leachable, in the pores of the catalyst and pre-sulphurising pre-carbonised catalyst.

* * * * *